United States Patent
Murakoshi et al.

(10) Patent No.: US 6,928,838 B2
(45) Date of Patent: Aug. 16, 2005

(54) APPARATUS AND METHOD FOR FORMING SILICA GLASS ELEMENTS

(75) Inventors: Hiroshi Murakoshi, Mishima (JP); Shusaku Matsumura, Numazu (JP)

(73) Assignee: Toshiba Machine Co., Ltd., Tokyo (JP)

(*) Notice: Subject to any disclaimer, the term of this patent is extended or adjusted under 35 U.S.C. 154(b) by 477 days.

(21) Appl. No.: 10/243,647

(22) Filed: Sep. 16, 2002

(65) Prior Publication Data

US 2003/0056542 A1 Mar. 27, 2003

(30) Foreign Application Priority Data

Sep. 27, 2001 (JP) ............................. 2001-298087

(51) Int. Cl.[7] .............................................. C03B 11/12
(52) U.S. Cl. .................. 65/102; 65/111; 65/374.15; 65/306; 65/319
(58) Field of Search ........................... 65/374.15, 374.1, 65/374.13, 319, 306, 355, 102, 305, 111; 425/411, 412, 193, 406; 249/175, 187.1

(56) References Cited

U.S. PATENT DOCUMENTS

| | | | |
|---|---|---|---|
| 3,900,328 A | | 8/1975 | Parsons et al. |
| 4,882,827 A | * | 11/1989 | Kusumi et al. ............. 29/527.2 |
| 5,246,198 A | * | 9/1993 | Kurihara ................. 249/114.1 |
| 5,264,016 A | | 11/1993 | Komiyama |
| 5,346,522 A | * | 9/1994 | Komiyama et al. ............. 65/64 |
| 5,380,349 A | * | 1/1995 | Taniguchi et al. ............. 65/286 |
| 5,382,274 A | * | 1/1995 | Yamamoto et al. ............. 65/26 |
| 5,711,780 A | * | 1/1998 | Taniguchi ..................... 65/286 |
| 5,782,946 A | | 7/1998 | Komiyama et al. |
| 5,938,807 A | * | 8/1999 | Komiyama et al. ........ 65/29.12 |
| 6,003,336 A | * | 12/1999 | Kashiwagi et al. .... 204/192.15 |
| 6,370,918 B2 | * | 4/2002 | Fukuyama et al. ........... 65/319 |
| 6,560,994 B1 | * | 5/2003 | Hirota ........................... 65/24 |

FOREIGN PATENT DOCUMENTS

JP 2002255566 A * 9/2002 ........... C03B/11/00

* cited by examiner

*Primary Examiner*—Steven P. Griffin
*Assistant Examiner*—Carlos Lopez
(74) *Attorney, Agent, or Firm*—Pillsbury Winthrop Shaw Pittman LLP

(57) ABSTRACT

The forming apparatus has top and bottom die assemblies which form a heated silica glass material by press forming. These top and bottom die assemblies include, respectively, mold dies, which are made of isotropic carbon, and core molds, which are made of vitrified carbon. The heating and pressing time of a silica glass element, which requires a high forming temperature, is shortened by pinching the silica glass material between top and bottom core molds by controlling a torque so as to produce a close contact condition which permits heat transfer from the top and bottom core molds to the silica glass material between the top and bottom core molds.

10 Claims, 2 Drawing Sheets

APPARATUS AND METHOD FOR FORMING SILICA GLASS ELEMENTS

CROSS-REFERENCE TO RELATED APPLICATIONS

This application is based upon and claims the benefit of priority from the prior Japanese Patent Application No. 2001-298087, filed Sep. 27, 2001, the entire contents of which are incorporated herein by reference.

BACKGROUND OF THE INVENTION

1. Field of the Invention

The present invention relates to an apparatus and a method for forming silica glass elements in which the shortening of the heating time of a glass material for forming is particularly aimed at.

2. Description of the Related Art

Methods for manufacturing glass elements such as glass lenses that are required to provide high accuracy are broadly divided into two: a method which involves forming optical surfaces by grinding and polishing a glass material and a method by reheat pressing. Glass elements are often manufactured by the former method.

In the former method, however, a dozen or so steps are required for forming curved surfaces by grinding and polishing. In addition, there arises a problem that large amounts of glass grinding dust harmful to workers are generated. Moreover, the former method has another problem that it is difficult to manufacture high-value added glass elements having optical surfaces of aspherical surface shape with the same accuracy and in large quantities.

In contrast, in the latter manufacturing method by reheat pressing, by the heating and pressing of a glass material having a predetermined form, the shape of dies is printed onto the glass material thereby to form a glass element such as a glass lens. For this reason, this manufacturing method has an advantage that only one step of press forming is necessary for forming curved surfaces. Furthermore, this method has another advantage that once dies are fabricated, a large number of glass elements can be manufactured according to the accuracy of the dies.

In recent years, silica glass elements have received significant attention for such reasons as small thermal expansion, small impurities and good ultraviolet transmittivity, and uses of silica glass elements are expected in the fields of optical communications and medical services. For this reason, various types of silica glass elements including those of complex shape, such as microlens arrays, and various sizes from ultra-miniature to large size have come to be required.

However, when silica glass elements are formed by the above-described manufacturing method by repeat pressing, the following problems exist awaiting solutions. In the manufacturing method by reheat pressing, a glass material is interposed between dies, the interior of a forming chamber including the dies and glass material is brought into an inert gas atmosphere or a vacuum atmosphere in order to prevent the oxidation of the dies, the glass material is then heated by a resistance heating device, a high-frequency heating device, an infrared lamp, etc. and pressed by the dies, and a formed article is taken out after cooling. When a usual optical glass is formed, the forming temperature is about 700° C. at the highest and cemented carbide alloys (WC, tungsten carbide) are generally used as die materials. However, in the case of glass materials of high melting point such as a silica glass material, which requires a high forming temperature of about 1400° C., it is necessary to use die materials which have heat resistance at high temperatures. Moreover, a silica glass material has a problem that the material devitrifies due to crystallization when exposed to high temperatures of not less than 1200° C. for a long time. Because a glass element which has devitrified cannot be used as an optical element, in reheat pressing it becomes necessary to shorten the heating and pressing time.

BRIEF SUMMARY OF THE INVENTION

It is an object of the invention to shorten the heating and pressing time during the forming, by reheat pressing, of a silica glass element which requires a high forming temperature in the forming.

Another object of the invention is to improve the thermal conductivity from top and bottom die assemblies to a silica glass material in order to shorten the heating and pressing time.

A further object of the invention is to improve combinations of the materials for top and bottom core molds and top and bottom mold dies surrounding the periphery thereof that constitute top and bottom core mold in order to improve the thermal conductivity from the top and bottom core molds to the silica glass material.

Still a further object of the invention is to improve the condition of contact between the top and bottom core molds and the silica glass material in order to improve the thermal conductivity from the top and bottom core molds to the silica glass material.

In order to achieve these objects, an apparatus for forming silica glass elements related to the invention comprises the following component parts and a method for forming silica glass elements related to the invention comprises the following steps.

1. There is provided an apparatus for forming silica glass elements, which comprises: a top die assembly; the top die assembly comprising a top mold die made of isotropic carbon and a top core mold peripheral of which is held by the top mold die and made of vitrified carbon; a bottom die assembly; the bottom die assembly comprising a bottom mold die made of isotropic carbon and a bottom core mold peripheral of which is held by the bottom mold die and made of vitrified carbon; a silica glass material being interposed between top and bottom core molds of the top and bottom die assemblies; heating means; the heating means heating the top and bottom die assemblies and silica glass material; and pressing means; the pressing means performing the press forming of a heated silica glass material between the top and bottom die assemblies thereby to form a silica glass element.

2. There is provided an apparatus for forming silica glass elements, in which the top die assembly further comprises a top die plate to which the top mold die and top core mold are attached, the bottom die assembly further comprises a bottom die plate to which the bottom mold die and bottom core mold are attached, and the apparatus further comprises: a top heat insulating cylinder; the top heat insulating cylinder being attached to the top end of the top die plate of the top die assembly; a fixed shaft; the fixed shaft being attached to the top end of the top heat insulating cylinder; a bottom heat insulating cylinder; the bottom heat insulating cylinder being attached to the bottom end of the bottom die plate of the bottom die assembly; and a moving shaft; the moving shaft being attached to the bottom end of the bottom heat insulating cylinder.

3. There is provided an apparatus for forming silica glass elements, which further comprises moving means, which axially moves a moving shaft, and control means, which controls the moving speed, position and torque of the moving shaft by the moving means.
4. There is provided an apparatus for forming silica glass elements, which further comprises a tube; the tube surrounding the peripheries of the top and bottom assemblies thereby defining a forming chamber, the forming chamber shutting off the top and bottom assemblies from the atmosphere.
5. There is provided an apparatus for forming silica glass elements, in which the tube is made of silica glass, and the heating means has heating means by infrared rays and disposed around the silica glass tube.
6. There is provided an apparatus for forming silica glass elements, which further comprises gas supply lines: the gas supply lines being formed in the fixed shaft and/or the moving shaft and supplying an inert gas to the interior of the forming chamber thereby to produce an inert gas atmosphere in the interior of the forming chamber and/or to cool the top and bottom die assemblies.
7. There is provided a method for forming silica glass elements, which comprises the steps of providing a top die assembly comprising a top mold die made of isotropic carbon and a core mold peripheral of which is held by the top mold die and made of vitrified carbon and a bottom die assembly comprising a bottom mold die made of isotropic carbon and a core mold peripheral of which is held by the bottom mold die and made of vitrified carbon; interposing a silica glass material between the top and bottom core molds of the top and bottom die assemblies; pinching the silica glass material disposed between the top and bottom core molds in a close contact condition so that heat transfer from the top and bottom core molds to the silica glass material becomes possible; heating the top and bottom die assemblies and silica glass material in this pinched condition to a prescribed temperature; and press forming the silica glass material which has been heated to the prescribed condition.
8. There is provided a method for forming silica glass elements, in which the step of pinching the silica glass material between the top and bottom core molds comprises the step of pinching the silica glass material between the top and bottom assemblies with a pinching force of 0.01 KN to 1 KN when the top and bottom die assemblies and silica glass material are heated.

According to the invention, in a device for heating and press forming silica glass elements, top and bottom mold dies (or drum die) of isotropic carbon and top and bottom core molds of vitrified carbon are used. Because isotropic carbon has a high thermal conductivity and the resistance to thermal shock is also good, the heating and pressing time can be shortened by using mold dies of this material. On the other hand, vitrified carbon has the following features. For example, this material has good heat resistance, can produce hard mirror surfaces, and is less apt to cause a reaction with silica glass. However, because vitrified carbon has a thermal conductivity lower than that of isotropic carbon, heat transfer from the mold dies of isotropic carbon is bad. In the invention, therefore, heating is performed with the silica glass material pinched between a pair of top and bottom core molds in a close contact condition which permits heat transfer. This can shorten the heating and pressing time remarkably and prevent devitrification reliably due to the crystallization of silica glass.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

DETAILED DESCRIPTION OF THE INVENTION

Figure 1:
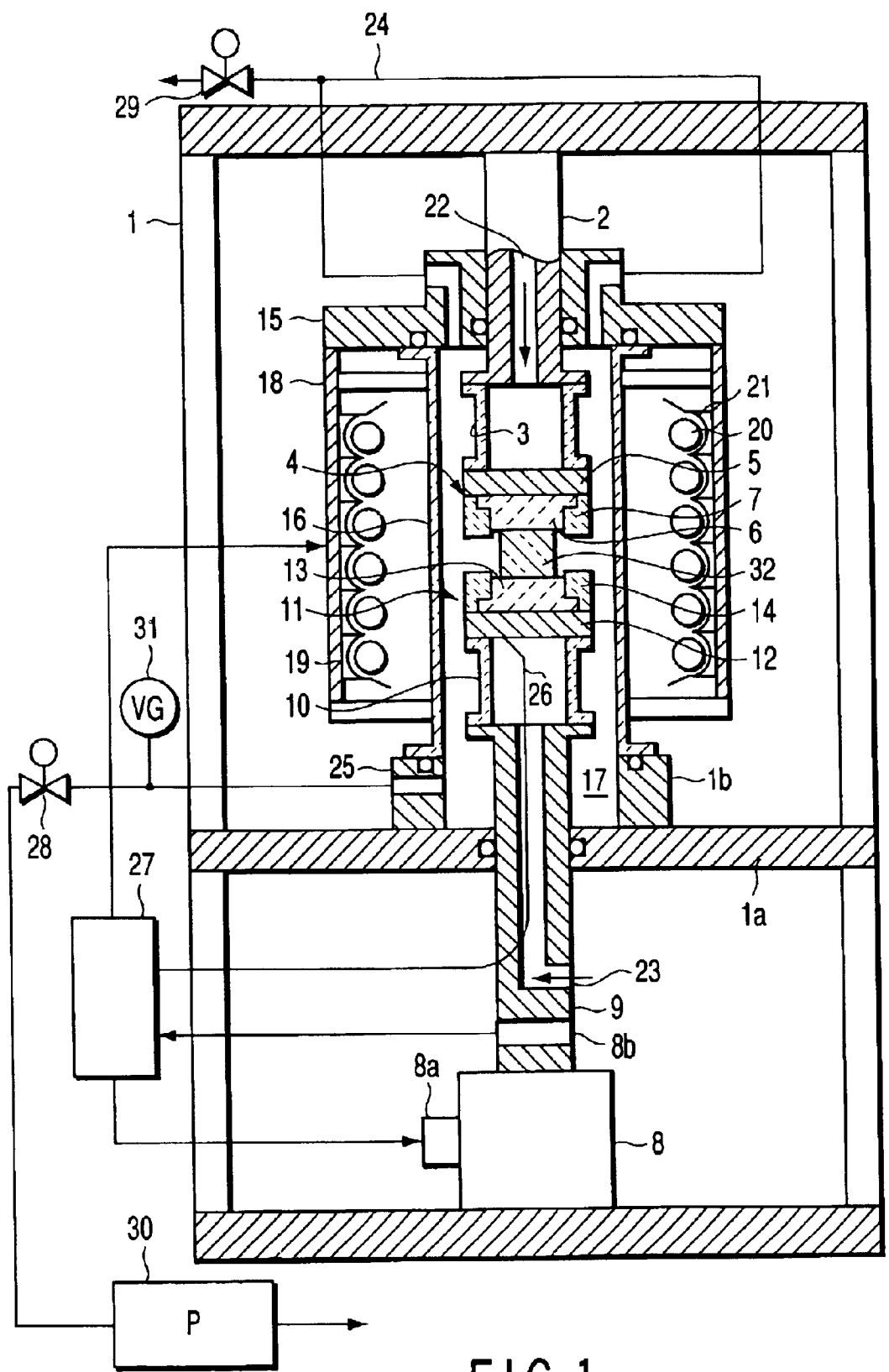
FIG. 1 is a schematic sectional view showing an example of an apparatus for forming optical elements.

An embodiment of the invention will be described below by referring to the drawings.

Figure 2:
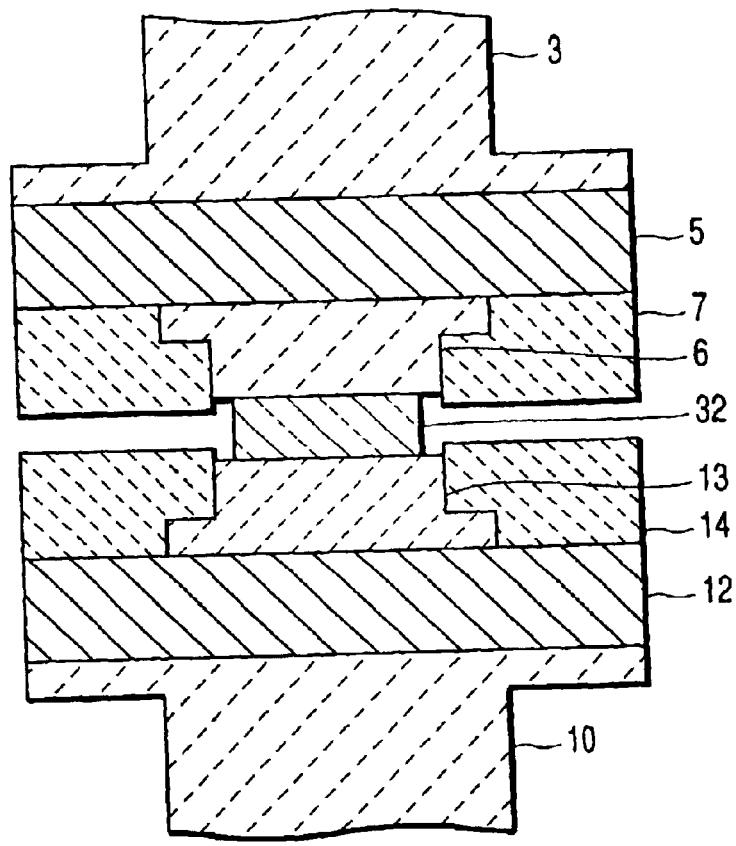
FIG. 2 is a partial enlarged view of FIG. 1.

An example of an apparatus for forming a silica glass element related to the invention is shown in FIG. 1 (a general view) and FIG. 2 (a partial enlarged view). In this apparatus, a fixed shaft 2 extends downward from the upper part of a frame 1 and at the bottom end of the fixed shaft 2 is attached a top die assembly 4 by a bolt, etc. (not shown) through a heat insulating cylinder 3 made of ceramics. The top die assembly 4 comprises a top die plate 5 made of metal or ceramic carbon, a top core mold 6 for forming a figure of a silica glass element to be formed and made of vitrified carbon and a top mold die 7 surrounding a periphery of the top core mold and made of isotropic carbon. The top mold die 7 and top core mold 6 are attached to top die plate 5, and the top die plate 5 is attached to a heat insulating cylinder 3.

A drive unit 8, such as a screw jack, which uses a servomotor 8a as a drive source and converts the rotational movement of the servomotor 8a to a linear line movement, and a moving shaft 9 is attached to the drive unit 8 through a load sensor 8b. The moving shaft 9 extends upward opposite to the fixed shaft 2 and moves up and down by a program input to a controller 27 with the speed, position and torque of the moving shaft capable of being controlled. A heat insulating cylinder 10 similar to the heat insulating cylinder 3 is attached to the top end of the moving shaft. A bottom die assembly 11 is attached by a bolt etc. (not shown) through the heat insulating cylinder 10. The bottom die assembly 11 comprises a bottom die plate 12 made of metal or ceramic carbon, a bottom core mold 13 made of vitrified carbon and a bottom mold die 14 made of isotropic carbon. The bottom mold 14 and bottom core mold 13 are attached to the bottom die plate 12, and the bottom die plate 12 is attach to a heat insulating cylinder 10.

A bracket 15 is movably connected to the above-described fixed shaft 2, and this bracket 15 is moved up and down by a drive unit (not shown). To this bracket 15 are attached a tube made of preferable transparent silica glass tube (thereinafter, silica glass tube is referred) 16 provided with a flange, which surrounds the peripheries of the top and bottom die assemblies 4, 11 in a pair, and an outer cylinder 18, which is provided around the silica glass tube. A lamp unit 19 is attached to the inner periphery of the outer cylinder 18. The lamp unit 19 comprises an infrared lamp 20, a reflecting mirror 21 disposed behind the infrared lamp 20 and a water cooled tube (not shown) to cool the reflecting mirror 21. The lamp unit 19 heats the top and bottom die assemblies 4, 11 and a silica glass material 32 disposed between the top and bottom die assemblies.

A flange portion of the top end of the silica glass tube 16 is in airtight abutment with an O-ring fitted into the bracket 15. The frame 1 comprises an intermediate plate 1a, and the moving shaft 9 pierces this intermediate plate 1a in airtight abutment with an O-ring of the intermediate plate 1a. A flange portion of the bottom end of the silica glass tube 16 is in airtight abutment with an O-ring of a base 1b attached to the intermediate plate 1a. A forming chamber 17, which is enclosed by the bracket 15, silica glass tube 16, base 1b and intermediate plate 1a, is formed around the top and bottom die assemblies 4, 16, and this forming chamber is shut off from the atmosphere.

The above-described fixed shaft 2 and moving shaft 9 are respectively provided with gas supply lines 22, 23 to produce an inert gas atmosphere in the forming chamber 17 and/or to cool the top and bottom die assemblies 4, 11. An inert gas is supplied through these gas supply lines 22, 23 to the forming chamber 17. The flow rate of inert gas is controlled by a flow controller (not shown) to a prescribed flow rate. The inert gas supplied to the forming chamber 17 is exhausted from a gas exhaust line 24. Incidentally, the numeral 25 denotes a vacuum exhaust port, the numeral 26 a temperature-sensing thermocouple of the bottom die assembly 11, the numeral 28 a vacuum valve, the numeral 29 a gas exhaust valve, the numeral 30 an evacuation device, and the numeral 31 a vacuum gauge.

Next, this embodiment will described below. Incidentally, the invention is not limited to this embodiment.

Silica Glass Material

Because silica glass has a very good infrared transmittivity, it is difficult to heat the silica glass itself by an infrared lamp. For this reason, it is preferable to heat a silica glass material by heat transfer from the core molds. In this embodiment, a test was carried out by using molten quartz as a silica glass material. The material shape is 20 mm diameter×2 mm thickness. The forming temperature of molten quartz is 1500° C. White turbidity of a silica glass element begins to occur due to starting crystalization of silica glass when the forming temperature of not less than 1200° C. is long (not less than about 300 seconds).

Mold Die Material

Isotropic carbon (SFG-2: POCO GRAPHITE (brand name)) was used as the material for the mold dies 7, 14. This isotropic carbon has a good thermal conductivity of 121 W/m·K and the resistance to thermal shock is also good. Incidentally, for comparison, the test was carried out also in a case where SiC was used as the mold die material. In this case, heat resistance and thermal conductivity (63 W/m·K) were good but resistance to thermal shock was low. A breakdown occurred due to thermal shock when the heating rate was not less than 5° C./sec. Thus, SiC is apt to break down due to thermal shock and it is necessary to lower the temperature rise rate. Therefore, it is impossible to raise the heating rate.

Core Mold Material

Vitrified carbon was used as the material for the core molds 6, 13 which form a silica glass material 32. This material has the following features. For example, this material has good heat resistance, can produce hard mirror surfaces, and is less apt to cause a reaction with silica glass. On the other hand, this material has the disadvantage that heat transfer from the mold die (isotropic carbon) 7, 14 is bad because of a low thermal conductivity (5.8 W/m·K).

Close Contact Between Top and Bottom Core Molds and Silica Glass Material

Therefore, in heating a silica glass material 32, it is necessary that the area of contact of the silica glass material 32 with the top and bottom core molds be large. For this reason, heating by an infrared lamp 20 was carried out, with the top and bottom core molds 6, 13 brought into close contact with the silica glass material 32, by controlling a torque so as to prevent a breakdown of the top and bottom core molds and silica glass material 32 and, at the same time, in such a manner as to pinch the silica glass material 32 in a close contact condition which permits heat transfer from the top and bottom core molds to the silica glass material 32 between the top and bottom core molds. Concretely, the silica glass material 32 was formed to a silica glass element by performing torque control so that a pinching force of 0.01 KN to 1 KN is applied to between the top and bottom core molds, followed by the top and bottom core molds and silica glass material were heated to the temperature of 1500° C. at which temperature silica glass element is formable, then, a pressing force of 5 KN is applied between the top and bottom core molds. As a result, during the above process the period of time at the high temperature of not less than 1200° C. is about 300 sec. Devitrification did not occur in the silica glass element after forming due to the shortness of the high temperature of not less than 1200° C. during this process.

In contrast, by use of vitrified carbon as the material for the mold dies and by use of a conventional apparatus of the same construction as the embodiment in other respects, the same silica glass element as the above-described embodiment was formed by the same method as the above-described method except that the top and bottom core molds and silica glass material was not close contact. In this case, devitrification occurred in a silica glass element after forming, because during this forming process the period of time at high temperature of not less than 1200° C. is 500 sec. which is enough period of time to start crystallization of silica glass element.

As is apparent from the above-described embodiment, according to the invention method for forming glass elements, even in a case where silica glass is formed, forming can be performed without causing devitrification of the silica glass. Furthermore, because the forming time becomes short, it is possible to fabrication cost.

Figure 3:
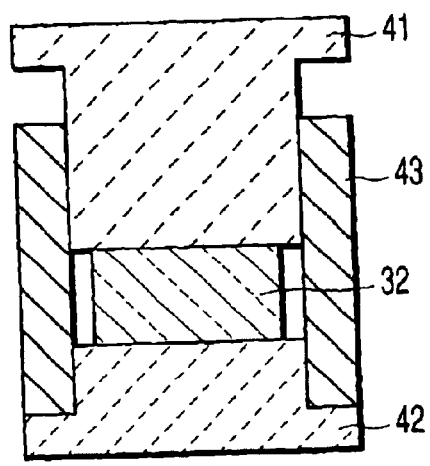
FIG. 3 is a partial enlarged view showing another example of an apparatus for forming optical elements.

The present invention is not limited to the above examples. The present invention may be applied to an apparatus having resistance heating device or high frequency heating device, for heating mold die and core molds. Further the present invention may be applied to an apparatus having prior art die construction which comprises core molds 41, 42 and drum die 43 (see FIG. 3). In the apparatus shown in FIG. 3, drum die 43 is made of isotropic carbon and core molds 41, 42 are made of vitrified carbon.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for forming silica glass elements, comprising the steps of:

providing a top die assembly comprising a top mold die made of isotropic carbon and a core mold peripheral of which is held by said top mold die and made of vitrified carbon and a bottom die assembly comprising a bottom mold die made of isotropic carbon and a core mold peripheral of which is held by said bottom mold die and made of vitrified carbon;

interposing a silica glass material between the top and bottom core molds of the top and bottom die assemblies;

pinching the silica glass material disposed between the top and bottom core molds in a close contact condition so that heat transfer from the top and bottom core molds to the silica glass material becomes possible;

heating the top and bottom die assemblies and silica glass material in this pinched condition to a prescribed temperature; and press forming the silica glass material which has been heated to the prescribed condition.

2. In the method according to claim 1, the step of pinching the silica glass material between the top and bottom core molds comprises the step of pinching the silica glass material between the top and bottom assemblies with a pinching force of 0.01 KN to 1 KN when the top and bottom die assemblies and silica glass material are heated.

3. A method for forming silica glass elements, comprising the steps of:

providing a drum die made of isotropic carbon and a top and bottom core molds peripheral of which is movably supported by said drum die and made of vitrified carbon;

interposing a silica glass material between the top and bottom core molds;

pinching the silica glass material disposed between the top and bottom core molds in a close contact condition so that heat transfer from the top and bottom core molds to the silica glass material becomes possible;

heating the drum die, top and bottom core molds and silica glass material in this pinched condition to a prescribed temperature; and press forming the silica glass material which has been heated to the prescribed condition.

4. An apparatus for forming silica glass elements, comprising:

a top die assembly;

said top die assembly comprising a top mold die made of isotropic carbon and a top core mold peripheral of which is held by said top mold die and made of vitrified carbon;

a bottom die assembly;

said bottom die assembly comprising a bottom mold die made of isotropic carbon and a bottom core mold peripheral of which is held by said bottom mold die and made of vitrified carbon;

a silica glass material being interposed between top and bottom core molds of said top and bottom die assemblies;

heating means;

said heating means heating said top and bottom die assemblies and silica glass material; and pressing means;

said pressing means performing the press forming of a heated silica glass material between said top and bottom die assemblies thereby to form a silica glass element.

5. The apparatus according to claim 4, wherein the top die assembly further comprises a top die plate to which the top mold die and top core mold are attached, the bottom die assembly further comprises a bottom die plate to which the bottom mold die and bottom core mold are attached, and the apparatus further comprises:

a top heat insulating cylinder;

said top heat insulating cylinder being attached to the top end of the top die plate of the top die assembly;

a fixed shaft;

said fixed shaft being attached to the top end of the top heat insulating cylinder;

a bottom heat insulating cylinder;

said bottom heat insulating cylinder being attached to the bottom end of the bottom die plate of the bottom die assembly; and a moving shaft;

said moving shaft being attached to the bottom end of the bottom heat insulating cylinder.

6. The apparatus according to claim 5, further comprising:

moving means;

said moving means axially moving a moving shaft; and control means;

said control means controlling the moving speed, position and torque of the moving shaft by the moving means.

7. The apparatus according to claim 4, further comprising:

a tube;

said tube surrounding the peripheries of the top and bottom assemblies thereby defining a forming chamber, said forming chamber shutting off the top and bottom assemblies from the atmosphere.

8. The apparatus according to claim 7, wherein said tube is made of silica glass, and said heating means has heating means by infrared rays and disposed around said silica glass tube.

9. The apparatus according to claim 5, further comprising:

gas supply lines:

said gas supply lines being formed in the fixed shaft and/or the moving shaft and supplying an inert gas to the interior of the forming chamber thereby to produce an inert gas atmosphere in the interior of the forming chamber and/or to cool the top and bottom die assemblies.

10. An apparatus for forming silica glass elements, comprising:

a drum die made of isotropic carbon and a top and bottom core molds peripheral of which is movably supported by said drum die and made of vitrified carbon;

a silica glass material being interposed between top and bottom core molds;

heating means;

said heating means heating said drum die and top and bottom core mold and silica glass material; and pressing means;

said pressing means performing the press forming of a heated silica glass material between said top and bottom core molds thereby to form a silica glass element.

* * * * *